United States Patent [19]

Keefe

[11] 4,397,305
[45] Aug. 9, 1983

[54] SOLAR HEATING PANEL

[75] Inventor: Richard A. Keefe, Wilmette, Ill.

[73] Assignee: Solaroi, Inc., Wilmette, Ill.

[21] Appl. No.: 311,196

[22] Filed: Oct. 14, 1981

[51] Int. Cl.³ .............................................. F24J 3/02
[52] U.S. Cl. ...................................... 126/448; 126/450
[58] Field of Search ............... 126/418, 422, 432, 444, 126/445, 446, 447, 448, 450

[56] References Cited

U.S. PATENT DOCUMENTS

| | | | |
|---|---|---|---|
| 3,239,000 | 3/1966 | Meagher | 126/448 |
| 3,868,945 | 3/1975 | Konopka et al. | 126/416 |
| 3,943,911 | 3/1976 | Yu | 126/450 |
| 4,043,317 | 8/1977 | Scharfman | 126/422 |
| 4,046,134 | 9/1977 | Scott | 126/422 |
| 4,120,286 | 10/1978 | Farber | 126/448 |
| 4,122,828 | 10/1978 | Diperi | 126/445 |
| 4,134,389 | 1/1979 | McClintock | 126/444 |
| 4,146,012 | 3/1979 | Elkins et al. | 126/444 |
| 4,150,659 | 4/1979 | Buckley | 126/422 |
| 4,159,709 | 7/1979 | Palazzetti | 126/444 |
| 4,170,983 | 10/1979 | Sadler | 126/450 |
| 4,182,308 | 1/1980 | Reynolds | 126/437 |
| 4,213,449 | 7/1980 | Roth et al. | 126/447 |
| 4,219,009 | 8/1980 | Palmer | 126/422 |

Primary Examiner—Daniel J. O'Connor
Attorney, Agent, or Firm—Eugene I. Snyder

[57] ABSTRACT

A method of maintaining the temperature of a solar heating panel with glazing below about 220° C. utilizes convention cooling, where it is essential to the success of the method that the glazing be at least two inches above the upper surface of the collector. A panel of unitary construction of essentially the same plastic material which is an embodiment of the method can withstand the normal operating conditions to which such panels are subjected without thermal degradation of the plastic nor danger of rupture attending loss of physical integrity at excessive temperatures.

6 Claims, 6 Drawing Figures

SOLAR HEATING PANEL

BACKGROUND OF THE INVENTION

Although the sun is recognized as the major terrestrial energy source, the historically abundant availability of fossil fuels and their favorable economic utilization has discouraged the widespread use of solar energy. In recent years society has recognized that the finite, and rapidly disappearing, reserves of fossil fuels require alternate energy sources for continued survival. More recently, the escalating cost of fossil fuels has made solar energy an increasingly viable alternative in selected areas of energy consumption, such as in the heating and cooling of buildings, hot water production, and the like.

A common approach to harnessing the sun's energy for home heating and cooling has been to utilize solar heating panels which directly absorb sunlight on a blackened surface, thereby causing localized heating, with the heat being transferred to a central storage area or place of need by a heat transfer medium, generally a fluid which flows over, or through, heated surfaces. Water, in part or in whole, and air are the most common heat transfer media. Such panels consist essentially of:

1. a collector or absorber plate, which absorbs radiant energy and is characterized by a relatively high absorbtivity and low reflectivity of incident radiation;
2. channels through which a heat transfer medium flows in contact with the absorber plate;
3. glazing, or a highly transmittive top cover plate which reduces convective heat losses;
4. a frame, which is a structure which affords rigidity and mechanical integrity to the unit, separates the components, and balances their various functions;
5. conduits and fixtures necessary to regulate and connect the heat transfer medium within the panel to structures outside the panel such as conduits, piping, and manifolds;
6. insulation on the bottom side of the collector plate to reduce heat loss.

In the present state of the art, collectors commonly are of metal construction with their top surface often coated with a material providing high absorbtivity and low reflectivity, with the thermal conductivity characteristic of metals providing good heat transfer to the fluid. The main reason metals are used as materials of construction is their ability to mechanically and structurally withstand stagnation temperatures which can approach 400° F. and attending pressures up to about 100 psi. However, the cost of such units, even through reasonably efficient, is a major obstacle to increased solar energy utilization. The goal of many prior efforts in this field has been to develop a solar heating panel of greatly reduced cost.

The use of plastics as materials of construction is generally recognized to be cost advantageous. A serious problem attending their use when glazing and insulation are incorporated is their inability to withstand temperatures and pressures to which they may be subjected at stagnation, that is, a condition where the heat absorbing fluid is not flowing. A clever approach to this problem is the use of a highly absorbtive heat transfer medium which acts as an absorber flowing in channels within a plastic structure whose top surface is highly transmittive; U.S. Pat. No. 4,134,389. Other panels utilizing plastic require bonding or laminating various layers, as in U.S. Pat. Nos. 4,146,012 and 4,159,709, which do not speak to the problem attending high temperature development. Compare also U.S. Pat. No. 4,182,308, which requires several different materials of construction exclusive of the glazing and insulation. Where only low grade heat is desired, such as in pool heaters, plastic has been found acceptable as a material of construction, for example, U.S. Pat. No. 3,868,945. In such cases it is to be clearly understood that the deliberate omission of glazing and insulation obviates problems attending high temperatures of the absorbing surface and high internal pressures, since there are large convective heat losses.

Attempts have been made to maintain the temperature of glazed solar heating panels, especially the collector element, below degradation temperatures and blow-out pressures by venting the air plenum between the collector and glazing using temperature actuated means. Thus, U.S. Pat. No. 4,046,134 describes a method of preventing overheating of plastic solar heating panels by raising the glazing, thereby venting hot air and achieving cooling by convection. In U.S. Pat. No. 4,150,659 similar cooling by convection is achieved by use of a bellows-operated hinged damper. The patentee of U.S. Pat. No. 4,219,009 describes a method wherein venting gates at opposite ends of the air plenum are opened simultaneously in response to a heat-sensing module placed within the plenum.

Because a solar heating panel of unitary construction can afford great advantages, inter alia, in cost, in quality control, and in flexibility of size and shape, such an approach is highly desirable. This is described in U.S. Pat. No. 4,170,983 where the use of ceramic as the material of construction makes the cost prohibitive, its weight unwieldy and perhaps unworkable, and fluid flow characteristics impossible to predict. However, U.S. Pat. No. 4,213,449 describes a solar heating panel of unitary construction made of blow-molded polypropylene. The patentee there describes many of the advantages accruing to such a solar heating panel, which need not be repeated here. Although the substitution of polyethylene for the polypropylene used in the aforementioned patent would be highly desirable from a cost aspect, a serious objection is that inlet and outlet connections are awkward at best because of the way the manifold ports terminate at openings in all four corners. An even more serious objection to the panel described there is that it is inoperative because there is no provision for maintaining the panel below its degradation temperature. Simply put, the panel as described would melt or rupture.

The problem presented by a plastic solar heating panel is that stagnation temperatures in the neighborhood of 300° F. can be expected to be developed, and at such temperatures the most desirable materials of construction (from a cost aspect) would degrade or would otherwise undergo physical changes which would permanently destroy the structure, for example, channels in the collector element for the working fluid would blow out. A discovery leading to this invention is that the temperature of the collector can be maintained below about 220° F. provided the spacing between the collector and glazing is at least two inches. In particular, such temperature maintenance is achieved without any temperature sensing means or mechanical device actuated by such means. More particularly, said temperature maintenance is achieved by vents at the top and bottom sides of the panel where the venting area is in a mathematically described relation to the collector area.

Where the collector is rectangular, this relation depends only upon the length of the collector.

Thus, in one aspect the invention described herein is a method of maintaining the temperature of the collector less than about 220° F. In another aspect, the invention is an insulated plastic solar heating panel of unitary construction comprising a collector, a hollow frame of upstanding walls, and glazing at least two inches above the surface of the collector member, wherein the air plenum is continuously vented to maintain interior temperatures less than about 220° F.

SUMMARY OF THE INVENTION

An object of this invention is to provide a method of maintaining a collector temperature less than about 220° F. in a solar heating panel with glazing. An embodiment, which requires that the glazing be at least two inches from the upper surface of the collector element, comprises continuously venting the air plenum through venting ports placed at the top and bottom sides, where the surface area of said ports is at least 25% of the maximum area possible. Still another object of this invention is to provide a plastic solar heating panel whose body, or "mainframe," is of unitary construction and which incorporates the method of continuous convection cooling to prevent degradation of the plastic.

A major advantage of the solar heating panel of this invention is its low cost of construction, thereby making solar energy economically feasible for most residential units. It is to be emphasized that even through the efficiency of energy conversion of the panels described herein may be less than panels with a metal collector, the solar heating panel of this invention is cost effective.

Another advantage of the panel described herein is its unitary construction, which makes possible high production efficiency and excellent quality control while affording flexibility in size and shape of the panel, fluid handling methods, and choice of glazing.

A major advantage of the solar heating panel to be described is the control of internal temperatures below that which would lead to thermal degradation of the materials of construction. This affords a panel capable of a long, maintenance-free life. It should be recognized that systems incorporating panels with metal collectors frequently fail to utilize all the radiant energy actually absorbed. Stagnation temperatures as high as 400° F., and operating temperatures of 180° F. and higher are achived, whereas hot water above 120° F. is uncomfortable to the touch. In contrast, the panels of this invention will not experience temperatures above about 220° F., to prevent degradation, and therefore are virtually ideal for incorporation into a hot water system.

Yet another advantage of this invention is the facile replacement of damaged glazing, and even facile substitution of glazing materials where desired.

The solar heating panel described herein also possesses the advantages of low weight, thereby necessitating minimum modifications of a supporting structure, such as a roof, and ease of fabrication in diverse sizes and shapes to optimize space utilization or even to fulfill secondary esthetic considerations of the user. A modular array of panels is easily assembled, and replacement or repair of any individual panel is readily accomplished.

A major problem of plastic solar heating panels with insulation below the collecting member is that the differential thermal expansion of the insulation and panel material precludes adherence of the insulation to the panel, leading to uneven, inefficient insulation. This problem is solved in the panel described herein by incorporating into the region below the collector insulation locking means, such as routed slots in the interior walls of the hollow frame and supporting rib into which are inserted retaining rods, so that foamed-in insulation is mechanically locked in this region.

For these reasons, and others to become apparent from the following description, the invention of this application offers benefits not heretofore taught by the prior art.

DESCRIPTION OF THE INVENTION

As stated previously, the major hurdle to development of a relatively inexpensive plastic solar panel is degradation of the physical integrity of the plastic at stagnation temperature. FIG. 1 shows a partially cutaway perspective view of a basic solar heating panel comprising a collector, 1, a frame consisting of a collection of walls, 2, around the periphery of the collector, and glazing, 3. When used for hot water heating, the panel is mounted at an angle with the horizontal, $\theta$, or tilt angle, which is approximately equal to the latitude. As an example, for the continental United States, an angle of about 45° is satisfactory. A discovery upon which this invention is based is that provided the distance, s, between the glazing and upper surface of the collector is at least two inches, the collector can be maintained at a temperature less than about 220° F. by convection cooling through continuous venting of the air plenum by ports or openings, 4, at the top and bottom of said panel. By "top" is meant that side of the panel farthest from the ground; by "bottom" is meant that side nearest the ground. By "air plenum" is meant the air space defined by the collector, glazing, and frame. The temperature of 220° F. is important because several inexpensive plastics, especially polyethylene and polypropylene, can withstand such temperatures intermittently without undergoing permanent deformation and without such loss of physical integrity as to result in catastrophic events, such as rupture of the collector channels, thereby releasing the heat transfer medium normally flowing within.

The distance, s, between collector and glazing is critical. For an angle, $\theta$, of about 45° the distance must be at least two inches. As this angle increases to about 55° and more, the critical distance decreases; similarly, as the angle decreases to about 35° and less, the critical distance increases. It must be emphasized that the critical distance given here is a minimum, i.e., the method of this invention will operate satisfactorily so long as the distance, s, is at least 2 inches.

The area of the top and bottom sides between the upper surface of the collector and glazing is $A_{max}$, and is the maximum area of an opening through which the air plenum can be vented. Another critical feature of this invention is that the area of the actual venting ports or openings, $A_v$, on both top and bottom sides has a minimum operational value which is a function of s, the outside ambient temperature, t, panel length, l, and $\theta$ which can be expressed as, $$A_v = f(s, t, l, \theta) A_{max}$$

It has been determined that $f \approx 0.25$ at $S \sim 2$ inches, $t \sim 100°$ F., $l \sim 8$ feet, $\theta \sim 45°$;
$f \approx 0.35$ at $S \sim 2$ inches, $t \sim 100°$ F., $l \sim 4$ feet, $\theta \sim 45°$.

That is, at a collector-to-glazing distance of about 2 inches, tilt angle of about 45°, and an outside ambient temperature of about 100° F., an 8 foot panel requires venting ports whose area is at least 25% of the maximum possible, and a 4 foot panel requrires venting ports whose area is at least 35% of the maximum. It has been determined that the maximum temperature to which the collector is subjected at stagnation (or the maximum cooling achieved by continuous venting of the air plenum) is not a sensitive function of the area of the venting ports beyond the minimum stated. Therefore one can achieve a certain margin of safety at little cost in operating efficiency by operating with venting ports whose area is somewhat greater than the minimum. For $s \sim 2$ inches, $t \sim 100°$ F., and $\theta \sim 45°$, a preferred range of f for an 8 foot panel is 0.3–0.70, and a still more preferred range is 0.35–0.60; for a 4 foot panel the preferred range is 0.35–0.80, and a still more preferred range is 0.40–0.70; an acceptable range for panels from about 4 to about 8 feet long is 0.3–8.80.

The complete quantitive relationship between f and the independent variables s,t,l, and $\theta$ have not been determined. However, some qualitative features are clear. Thus, f decreases as s, l, and $\theta$ increase and as t decreases. The minimum vent opening required for successful application of the method which is our invention can be determined readily by the skilled artisan through simple experimentation and manipulation of the independent variables, and it is to be understood that the resulting variants are clearly within the scope of this invention.

The solar heating panel described herein which incorporates the method described above comprises a collecting member of a sheet of radiation absorbing plastic material having an inlet manifold and an outlet manifold at opposite ends with a plurality of channels within said sheet extending between and connecting said manifolds, providing a path for a flowing heat transfer fluid, a hollow frame, consisting of an interior and exterior wall enclosing an interior passageway, around the periphery of the collecting member, said member being connected at each point of its periphery to the approximate midpoint of the interior wall of said frame, a transparent glazing secured to the upper surface of the hollow frame thereby forming an air plenum, said glazing being at least two inches above the upper surface of the collecting member, a venting surface at the top and bottom of the interior wall of said frame, located between the collecting member and glazing, said surface comprising openings communicating with the air plenum and the interior passageway of the hollow frame, openings at opposite sides of the exterior walls communicating with the interior passageway of the hollow frame and the external environment, the surface area of the openings on each side being at least as large as the venting surface, inlet and outlet passageways for the heat transfer fluid extending through the hollow frame and firmly joined to the inlet and outlet manifold, respectively, and insulation whereby convective heat loss from the bottom of said collector member is reduced, the entire panel being of unitary contruction of the same plastic material. The device is made by blow-molding, rotational-molding, clam-shell molding, or an equivalent process, and the mainframe is of unitary construction. By "mainframe" is meant a panel exclusive of glazing, insulation, articles related thereto, and inlet and outlet connections. By "unitary construction" is meant that the article is formed of one continuous material, in this case plastic, without the need for separate bonding or joining of its elements. The device as described and claimed solves the problem attending the inability of plastic to withstand stagnation temperatures by maintaining internal temperatures at a level below that which causes thermal degradation. The device also presents numerous advantages over the prior art panels as was discussed above.

FIG. 1 as stated, shows a partially cutaway perspective view of a basic solar heating panel.

Figure 1:
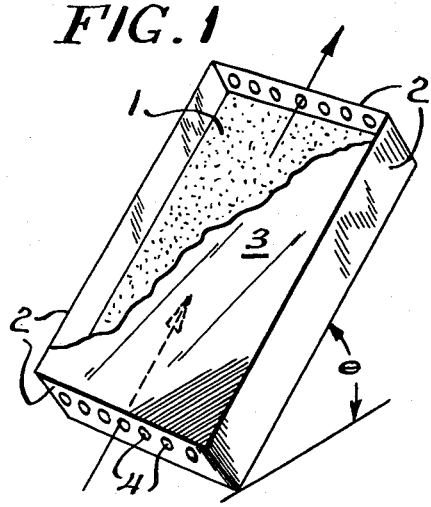
Figure 2:
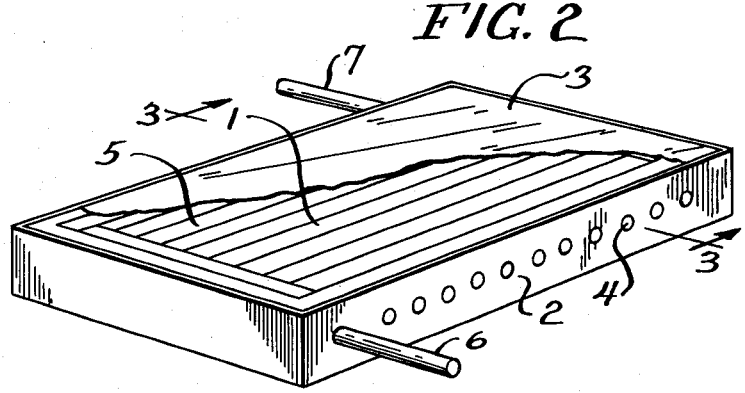
FIG. 2 is a schematic view of the solar heating panel with part of the glazing cut away to show the interior.

FIG. 2 shows a rectangular, box-like solar heating panel in perspective. It is to be understood that the dimensions of the panels of this invention may be varied and are not critical to its success, and this invention is to be understood to encompass a diversity in size. The glazing, 3, show here as a single layer, is attached to the top of a hollow frame consisting of a collection of walls, 2, which surrounds and is joined to the periphery of the collecting member, 1, with conduits, 5, connecting manifolds located at opposite ends of the collecting member and forming a path for a flowing heat transfer medium through the collecting member. For convenience in describing the invention, the top and bottom sides are farthest from and closest to, respectively, the ground, and are those adjacent to the outlet and inlet manifolds, respectively. Inlet and outlet passageways, 6, and 7, respectively, are shown for the heat transfer medium. Insulation, located under the bottom side of the collecting member, is not depicted here.

Figure 3:
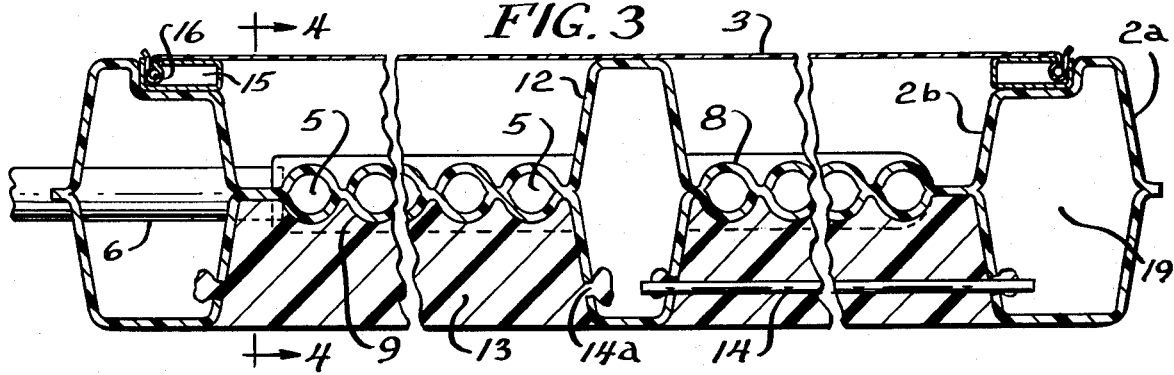
FIG. 3 is a transverse section along the line 3—3 of FIG. 2 drawn to a larger scale and somewhat broken away.

FIG. 3, 8 is the upper surface of the absorbing or collecting member. By upper surface is meant that surface intended to face the sun. This surface is treated so as to maximize the absorbtion of incident radiation while minimizing reflectivity. In a preferred embodiment, this top surface is a carbon filled plastic, such as polyethylene or polypropylene, deliberately roughened so as to reduce reflectivity, althrough other embodiments, such as a selectively coated plastic, are to be construed as within the scope of this invention. The heat transfer medium is constrained to flow along channels, which in this embodiment are non-interconnecting conduits, 5, disposed in a parallel, closely spaced relationship. Although the conduits are shown here as circular, their shape is not critical, and other geometries, such as oval, elliptical, triangular, trapezoidal, and so forth, may be used. A critical feature of this panel is that the glazing, 3, closest to the collecting member be at least two inches from its upper surface, 8, and preferably not more than about three inches from the upper surface. A supporting rib, 12, begins and ends several inches from each manifold and runs lengthwise in the middle of the collecting member.

Insulation, 13, is placed underneath the bottom surface, 9, of the collecting member. A novel and important feature of the panel which is our invention is that the problem of creep, that is, the tendency of the insulation not to adhere to the plastic because of differential thermal expansion of the two materials, is solved by mechanically locking in insulation which is foamed into place. This is done by routing out portions of the interior walls and supporting rib and placing therein retaining rods, 14. Because the routed out slots, 14a, are oversized relative to the retaining rods, the insulation which is thereafter foamed in balloons into the cavities and around the rods, thereby securing the insulation. The retaining rods, which are about $\frac{1}{8}$ inch to about $\frac{1}{4}$ inch in diameter, are spaced irregularly but approximately every two feet. The rods may be of wood, plastic, or metal, with wood being preferred, and are placed in the lower third of the bottom half of the collector.

Transparent glazing is secured to the upper surface of the hollow frame at least two inches above the upper surface of the collecting member. Where the glazing is mechanically rigid, such as glass or Lexan TM, it can be fastened directly to the upper surface of the frame. In a preferred embodiment, the glazing, 3, is a strong but lightweight plastic, such as Tedlar TM or Flex Gard TM, which is attached to a framed structure, 15, by spline grooves, 16, located on the upper surface of said framed structure. The framed structure, whose preferred material of construction is aluminum, is placed around the entire top periphery of the hollow frame and is secured thereto by fastening means, such as plastic rivets going through the framed structure into the main body of the hollow frame underneath.

A consequence of the hollow frame aspect of the panel is that there is an exterior wall, 2a, and an interior wall, 2b, with the space between forming a passageway, 19, running the entire length of each side of the frame. Another important feature is that the passageways of adjacent sides communicate, so that in effect there is one continuous enclosed passageway along the perimeter of the panel between the exterior and interior walls of the frame.

Figure 5:
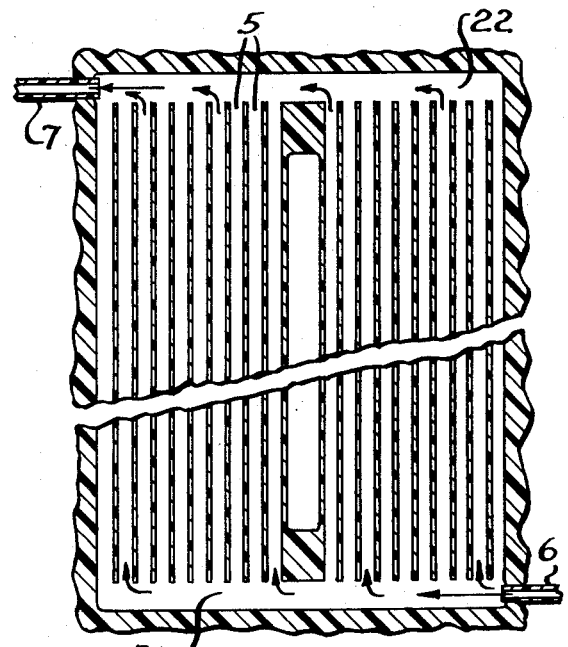
FIG. 5 is a top view of one embodiment of the collecting member.

FIG. 5 depicts the inlet and outlet manifolds, 21 and 22, respectively, located in the collecting member adjacent to the bottom and top sides, respectively. The manifolds communicate with the channels, here conduits, 5, through openings at their juncture, with the arrows indicating flow of the heat transfer fluid in the collecting member.

Figure 4:
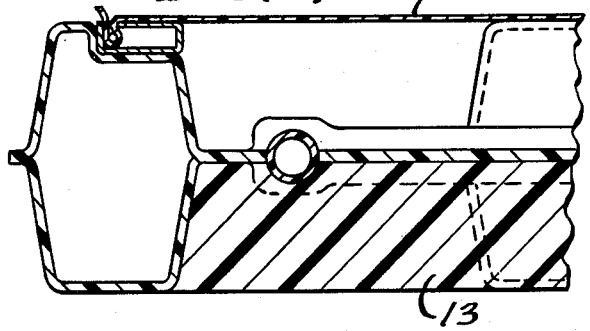
FIG. 4 is a transverse section along the line 4—4 of FIG. 3.

The manifolds also communicate with the inlet and outlet passageways, 6 and 7, each of which passes through the hollow frame and is firmly bonded or joined both to the manifold and exterior wall, as is shown with greater detail on the left-hand side of FIG. 3. These passageways are not integrally formed with the remainder of the panel and constitute separate elements which must be separately joined or bonded to the manifold. A preferred method of joining said passageways is by spin welding when the plastic is polyethylene. FIG. 4, which depicts a section through 4—4, gives an overall view of a passageway, manifold, and supporting rib.

Although proper manifold design can afford uniform flow through the channels in the collecting member, turbulent flow through the collecting member also is desirable to further optimize heat transfer. One means of providing turbulent flow is the alternative embodiment of a collecting member where there are interconnecting channels in the collecting member so arranged as to provide effective mixing of the flowing heat transfer fluid at a plurality of points. In this embodiment the surfaces of the collecting member are dimpled or waffled, extending into the interior of the collecting member. Successive planes of these indentations are offset from adjacent ones, providing irregular paths as channels for the flowing heat transfer medium.

It is to be emphasized that the novelty of our solar heating panel does not reside in design of the collecting member, and it is to be understood that other designs of this member may be used, although not necessarily with equivalent results.

Figure 6:
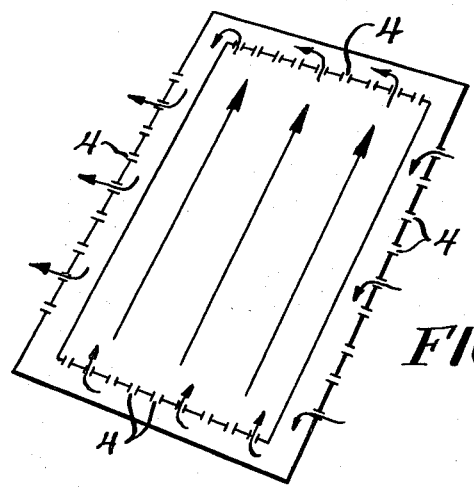
FIG. 6 is a schematic representation of the air flow through the panel during convection cooling.

An essential discovery leading to the solar heating panel of this invention is that thermal degradation of the plastic materials of construction may be obviated by continuously venting the air from the air plenum and replacing it with cooler external air; vida supra. The air flow and venting features are depicted with particularity in FIG. 6. Such venting is performed partly through venting surfaces, 4, in the interior walls at the top and bottom sides of the frame. These surfaces are openings or ports in the interior wall located between the glazing and collecting member so that the air plenum and the passageway of the hollow frame communicate through said openings. The total area of each such venting surface must be at least one-fourth the maximum area possible for an 8 foot long panel, and at least 0.35 the maximum area possible for a 4 foot panel. The maximum area is the total area of the interior wall on the top or bottom side of the frame between the collecting member and the glazing.

The continuous venting feature is performed in remaining part by the openings, 4, at opposite sides of the exterior walls whereby the interior passageway of the hollow frame communicates with the external environment. The total surface area of these openings is not critical, so long as it is at least as great as the area of the venting surfaces in the interior walls. The arrangement described above now constitutes a path for continuous convection cooling; cool air flows from the external environment into the passageway of the hollow frame through the openings in the exterior walls, then by convection through the openings in the interior walls from the bottom to the top of the air plenum, warm air flows into the passageway, and out into the environment through the openings in the exterior walls. This air flow is depicted by the arrows in FIG. 6.

The arrangement where the openings in the exterior wall are in the sides adjacent to the top and bottom sides of the frame is preferred as a means of minimizing accumulation of dirt and other foreign material in the air plenum. However, other arrangements are contemplated as being within the scope of this invention. Similarly, all venting surfaces and openings are contemplated as oval. However, neither their shape nor number is critical, nor even material, so long as air flow occurs over the entire surface of the collecting member. The critical feature is that each area of the venting surface, i.e., the venting surface at the top side and that at the bottom side, be at least 25% of the maximum area possible when the panel is 8 feet long, and at least 35% of the maximum area possible when the panel is 4 feet long. In a preferred embodiment, the area of the venting surface relative to the maximum area possible is from about 0.3–0.7 for an 8 foot panel, and from about 0.35–0.8 for a 4 foot panel.

The solar heating panel described herein readily may be utilized as a preheater for installation in a conventional hot water heater. In this application the heat transfer fluid may be a water-glycol mixture as in a closed loop heat exchanger, or merely water in a drainback or drain-down system. However, the applications of said panels are well known to those skilled in the art, as are heat transfer fluid media, and this example is to be construed merely as illustrative of the many possible permutations.

What is claimed is:

1. A solar heating panel comprising:
   a. a collecting member of a sheet of radiation absorbing plastic material having an inlet manifold and an outlet manifold at opposite ends thereof with a plurality of channels within said sheet extending between and connecting said manifolds, whereby a path is provided for a flowing heat transfer fluid;
   b. a hollow frame, consisting of an interior and exterior wall enclosing an interior passageway, around the periphery of the collecting member, said member being connected at each point of its periphery to the approximate midpoint of the interior wall of said frame;
   c. a transparent glazing secured to the upper surface of the hollow frame forming an air plenum, said glazing being at least two inches above the upper surface of the collecting member;
   d. a venting surface in the interior wall at the top and bottom sides of said frame and located between the collecting member and glazing, said surface comprising openings communicating with the air plenum and the interior passageway of the hollow frame;
   e. openings at opposite sides of the exterior walls communicating with the interior passageway of the hollow frame and the external environment, the surface area of the openings on each side being at least as large as said venting surface;
   f. inlet and outlet passageways extending through the hollow frame and firmly joined to the inlet and outlet manifold, respectively;
   g. foamed in insulation secured by retaining rods placed in oversized routed out slots whereby convective heat losses from the bottom of said collecting member is reduced, the mainframe of said panel being of unitary construction of essentially the same plastic material.

2. The solar heating panel of claim 1 wherein said channels are conduits disposed in a parallel, closely spaced relationship.

3. The solar heating panel of claim 1 wherein the glazing is attached to a framed structure held to the upper surface of the hollow frame by fastening means.

4. The solar heating panel of claim 1 wherein the glazing is between 2 and about 3 inches above the upper surface of the collecting member.

5. The solar heating panel of claim 1 wherein each of the venting surfaces has an area at least one-fourth the maximum area possible.

6. The solar heating panel of claim 5 wherein said area relative to the maximum area possible is between 0.3 and about 0.7 for an 8-foot panel, and from 0.35 to about 0.8 for a 4-foot panel.

* * * * *